US011809252B2

(12) United States Patent
Guim Bernat et al.

(10) Patent No.: US 11,809,252 B2
(45) Date of Patent: Nov. 7, 2023

(54) PRIORITY-BASED BATTERY ALLOCATION FOR RESOURCES DURING POWER OUTAGE

(71) Applicant: Intel Corporation, Santa Clara, CA (US)

(72) Inventors: Francesc Guim Bernat, Barcelona (ES); Suraj Prabhakaran, Aachen (DE); Karthik Kumar, Chandler, AZ (US); Uzair Qureshi, Chandler, AZ (US); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 950 days.

(21) Appl. No.: 16/524,868

(22) Filed: Jul. 29, 2019

(65) Prior Publication Data

US 2021/0034130 A1 Feb. 4, 2021

(51) Int. Cl.
*G06F 1/26* (2006.01)
*G06F 1/30* (2006.01)
*G06F 11/14* (2006.01)

(52) U.S. Cl.
CPC .............. *G06F 1/30* (2013.01); *G06F 1/263* (2013.01); *G06F 11/1474* (2013.01); *G06F 2201/87* (2013.01)

(58) Field of Classification Search
CPC ......... G06F 1/263; G06F 1/30; G06F 11/1474
See application file for complete search history.

(56) References Cited

U.S. PATENT DOCUMENTS

| 7,478,251 B1 * | 1/2009 | Diab .................... G06F 1/3209 713/340 |
| 2006/0212644 A1 * | 9/2006 | Acton ....................... G06F 1/30 711/E12.019 |
| 2012/0137289 A1 * | 5/2012 | Nolterieke ............ G06F 9/5094 718/1 |

(Continued)

FOREIGN PATENT DOCUMENTS

CN 105468544 A * 4/2016
WO WO-2014192113 A1 * 12/2014 .......... G06F 11/1441

OTHER PUBLICATIONS

Intel, "Intel Rack Scale Design (Intel RSD) Architecture Specification", Software v2.4, Revision 001, Document No. 608492-001, Apr. 2019, 124 pages.

(Continued)

*Primary Examiner* — Mark A Connolly
(74) *Attorney, Agent, or Firm* — Compass IP Law PC

(57) ABSTRACT

Examples described herein relate to management of battery-use by one or more computing resources in the event of a power outage. Data used by one or more computing resources can be backed-up using battery power. Battery power is allocated to data back-up operations based at least on one or more of: criticality level of data, priority of an application that processes the data, or priority level of resource. The computing resource can back-up data to a persistent storage media. The computing resource can store a log of data that is backed-up or not backed-up. The log can be used by the computing resource to access the backed-up data for continuing to process the data and to determine what data is not available for processing.

22 Claims, 14 Drawing Sheets

(56) References Cited

U.S. PATENT DOCUMENTS

| | | | |
|---|---|---|---|
| 2016/0011914 A1* | 1/2016 | Bohn | G06F 9/5094 |
| | | | 713/300 |
| 2016/0054780 A1* | 2/2016 | Bodas | H04L 43/08 |
| | | | 713/320 |
| 2018/0011714 A1 | 1/2018 | Han et al. | |
| 2018/0120925 A1* | 5/2018 | Takahashi | G06F 1/3206 |
| 2018/0192540 A1 | 7/2018 | Kumar et al. | |
| 2018/0337991 A1 | 11/2018 | Kumar et al. | |
| 2021/0034130 A1* | 2/2021 | Guim Bernat | G06F 1/3212 |
| 2022/0294232 A1* | 9/2022 | Guimarin | H02J 1/14 |

OTHER PUBLICATIONS

Intel, "Intel Rack Scale Design Architecture", White Paper, Data Center, Rack Scale Design, 2018, 6 pages.

Intel, "Intel Rack Scale Design PSME", User Guide, Software Version 2.1.3, Revision 003, Document No. 335460-003, May 2017, 68 pages.

Intel, "Intel Rack Scale Design", Architecture Specification, Software Version 2.1, Revision 001, Document No. 335501-001, Feb. 2017, 63 pages.

Intel, "Power Loss Imminent (PLI) Technology", Technology Brief, Document No. 330275-001 US, 2014, 8 pages.

SNIA (2013 Storage Networking Industry Association), "NVDIMM Messaging and FAQ", Solid State Storage Initiative, Contributor: AgigA Tech, Jan. 2014, 10 pages.

Titan Power, "Tips to Prolong the Life of a Data Center UPS Battery", https://www.titanpower.com/blog/tips-to-prolong-the-life-of-a-data-center-ups-battery/, Jan. 5, 2016, 1 page.

\* cited by examiner

PRIORITY-BASED BATTERY ALLOCATION FOR RESOURCES DURING POWER OUTAGE

TECHNICAL FIELD

Various examples described herein relate to managing power delivery for data and application state back-ups.

BACKGROUND

With rack scale design (RSD) and emerging memory technologies gaining prevalence, an important consideration that has emerged is data back-up and retaining application state in the event of a power failure. Memory and storage types include at least persistent memory (e.g., Intel Optane), dynamic random access memory (DRAM), and solid state drives (SSDs). Some types of memory devices are considered volatile whereby data stored on the memory devices is lost in the event that the memory devices lose power and do not have an alternate power supply. By contrast, non-volatile memory devices can retain data even if power is not supplied to the non-volatile memory devices.

A variety of types of memory and storage devices can be positioned in different locations and data traverses various memory and storage devices that are geographically disbursed. With emerging memory technologies, there can be multiple tiers of volatile caches, including DRAM used to store modified or processed data. Further, with the usage of remote direct memory access (RDMA), there can be volatile memory buffers in a switches or network devices that are traversed by data (e.g., modified data) before storage in a non-volatile storage or volatile memory with supplied power.

DETAILED DESCRIPTION

In cloud computing, massive amounts of data are in-flight traversing networks to processors or storage. A loss of power to a volatile memory device that stores data can cause the data to be lost and lead to lost processing time and data recovery efforts. In addition, loss of power to a volatile memory device can cause losing track of a location of data and status of a data write or read operation. Loss of power can cause a failure of time critical applications to meet time requirements for data processing within a prescribed time amount.

A current solution for handling loss of power to a volatile cache is to treat all dirty lines the same and try to flush all dirty lines to non-volatile memory or powered memory using battery power. A dirty line can be a cache line that stores data that has been modified compared to a version of the data stored in memory or storage. This approach may not be effective in cases where there are a lot of RDMA writes and large amounts of dirty data in switch buffers, as there may not be enough battery power to power completion of the transfers. It may necessitate tracking the volume of dirty data allowed to be backed-up based on battery capacity, resulting in a need to switch to write-through schemes that can impact performance.

Figure 1:
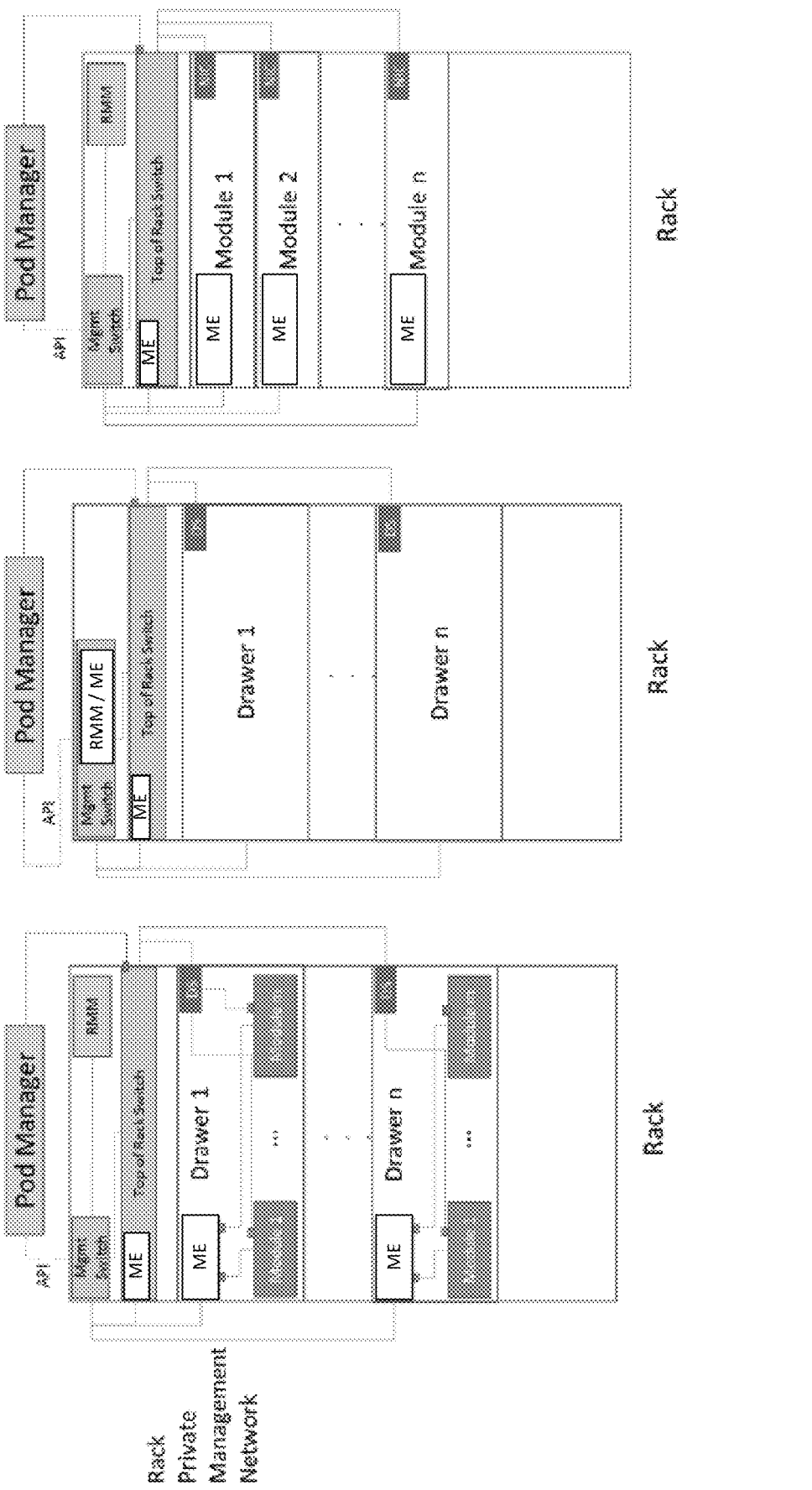
FIG. 1 depicts an example of a rack architecture where different drawers of compute devices can be managed for utilization.

FIG. 1 depicts an example of a rack architecture where different drawers of compute devices can be managed for processing or storage of data. The architecture provides resource disaggregation or resource pooling. A rack architecture allows scaling number of compute devices while permitting managing operation of compute devices. Devices can be treated as independent or composed as nodes. Other rack or platform architectures can be used to provide access to compute resources.

A pod is a collection of physical racks. A pod manager (PODM) uses application program interfaces (APIs) to communicate with the racks that make up a pod. The PODM discovers and records all resources within each rack in its pod and composes systems based on requests from the orchestration layer above. Depending on which available resources align most closely to the requested configuration, the PODM asks management engines (MEs) to perform the operations such as setting switch parameters, mapping IP addresses, creating namespaces and storage volumes, and so forth, and returns information to an orchestration layer to enable provisioning and workload distribution to the composed system. The PODM manages and aggregates the hardware resources within multiple racks in the pod by communicating with MEs and rack management modules (RMMs).

In some embodiments, a PODM manages one or multiple racks of compute and pooled resources and elements (e.g., MEs) within the pooled resources that configure connections with the compute resources. For example, a resource module in a rack has an ME software component that provides control of the hardware and capabilities support composability such as interconnect routing, storage volume creation, and so on.

RMM communicates with the ME and the PODM and performs rack-oriented functions including distributing security certificates to MEs, managing rack power and cooling, reporting environmental and health status, and designating and reporting the physical location of each asset within the rack. RMM can manage power and thermal resources within a rack by polling rack hardware and reports this information to PODM through APIs. RMM manages supply of power to each drawer or shared among drawers. Cooling can also be provided to each drawer to maintain an operating temperature of components from exceeding a maximum permitted temperature which can adversely affect device operation.

Figure 2:
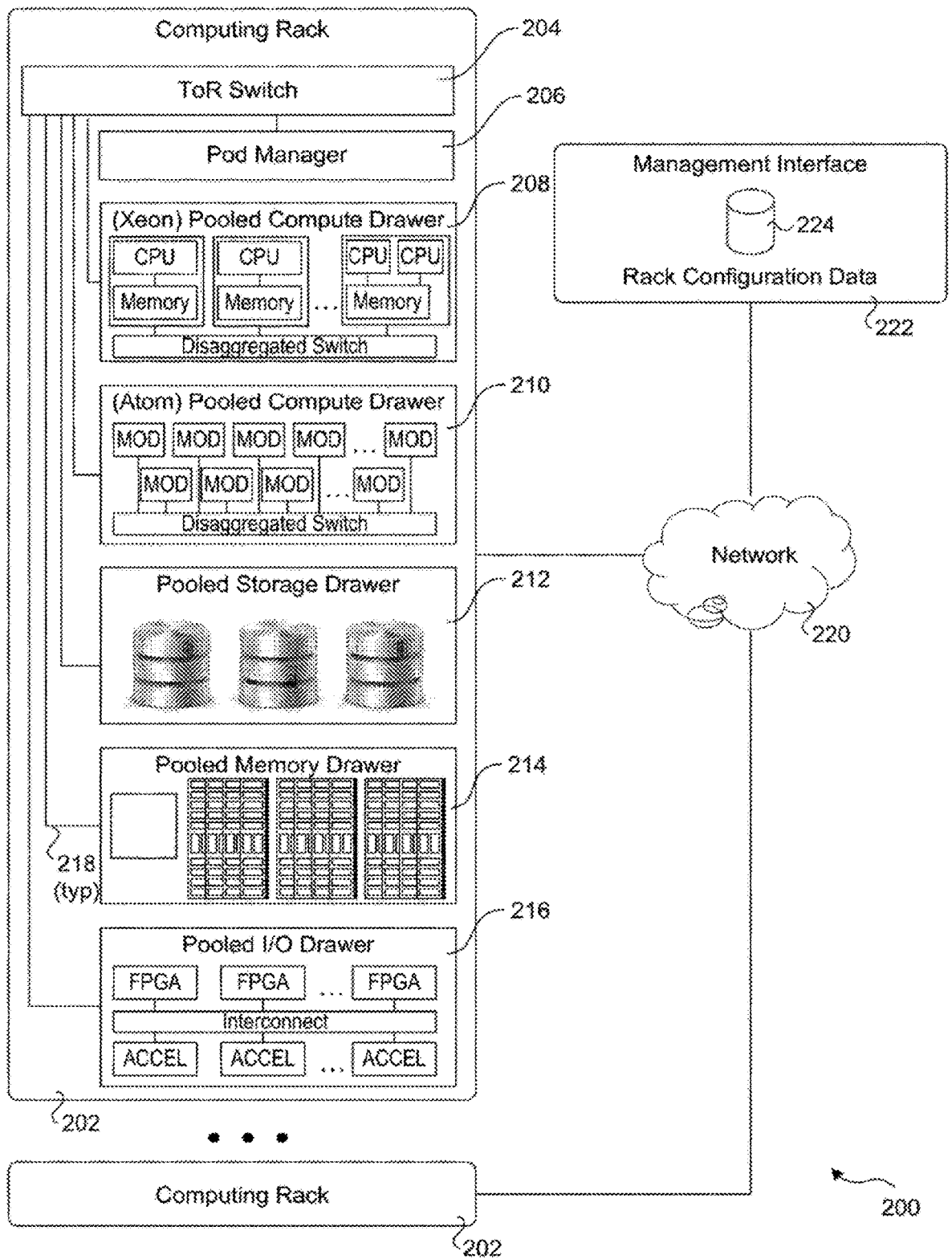
FIG. 2 depicts an environment includes multiple computing racks.

FIG. 2 depicts an environment that includes multiple computing racks 202, each including a Top of Rack (ToR) switch 204, a pod manager 206, and a plurality of pooled system drawers. Generally, the pooled system drawers may include pooled compute drawers and pooled storage drawers. Optionally, the pooled system drawers may also include pooled memory drawers and pooled Input/Output (I/O) drawers. Input/Output (I/O) drawers can include fixed function or programmable hardware devices (e.g., accelerators) that can perform particular functions. In the illustrated embodiment the pooled system drawers include an INTEL® XEON® pooled computer drawer 208, and INTEL® ATOM™ pooled compute drawer 210, a pooled storage drawer 212, a pooled memory drawer 214, and a pooled I/O drawer 216. Each of the pooled system drawers is connected to ToR switch 204 via a high-speed link 218, such as a 40 Gigabit/second (Gb/s) or 100 Gb/s Ethernet link and/or a 100+ Gb/s Silicon Photonics (SiPh) optical link (although other protocols and speeds can be supported). In some embodiments, high-speed link 218 comprises an 800 Gb/s SiPh optical link.

Multiple of the computing racks 202 may be interconnected via their ToR switches 204 (e.g., to a pod-level switch or data center switch), as illustrated by connections to a network 220. In some embodiments, groups of computing racks 202 are managed as separate pods via pod manager(s) 206. In one embodiment, a single pod manager is used to manage all of the racks in the pod. Alternatively, distributed pod managers may be used for pod management operations.

Environment 200 further includes a management interface 222 that is used to manage various aspects of the environment. This includes managing rack configuration, with corresponding parameters stored as rack configuration data 224.

Figure 3:
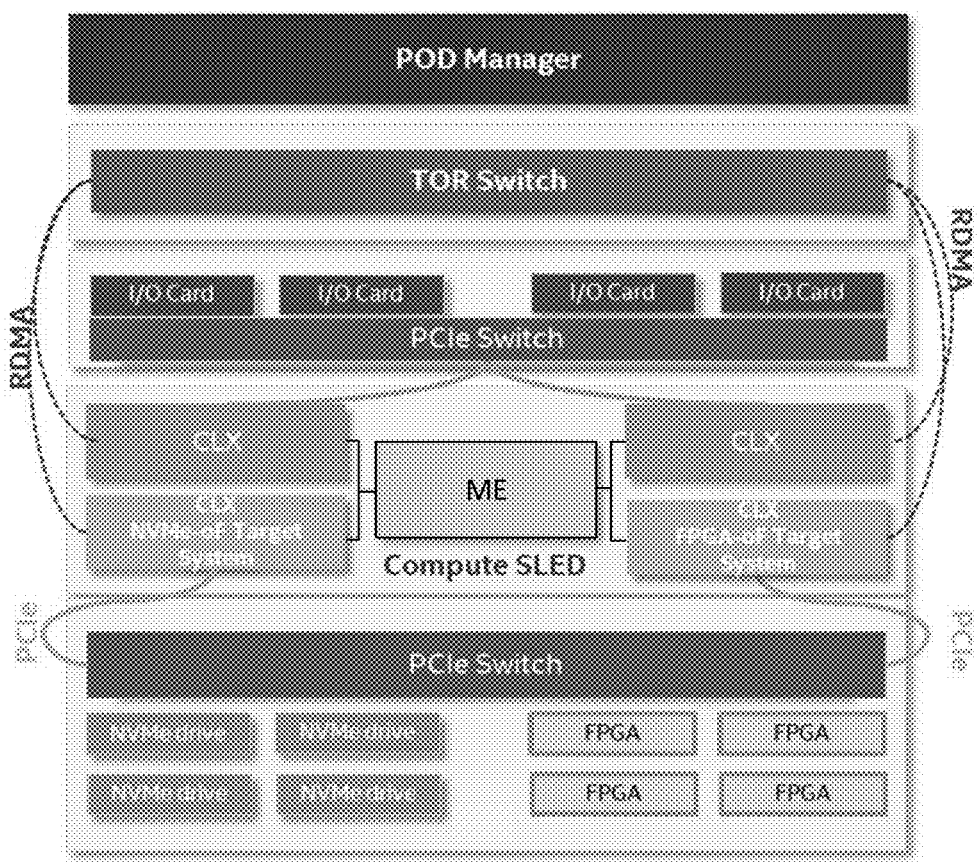
FIG. 3 depicts an example system.

FIG. 3 depicts an example system that provides resource disaggregation and resource pooling. Applications may run different kinds of services on a pod. For example, applications can include artificial intelligence inference engines, image recognition, augmented reality overlay applications, databases, website servers, cryptography, packet processing, and so forth. Applications can access, process, and generate data that is stored in volatile memory (e.g., cache or DRAM). For example, data processed by an application can be modified to generate modified data or new data. Databases, for example, can have critical tables containing customer information and auxiliary tables, containing statistical information or indexes, or other data that can be reconstructed, in some cases. In the event of a power outage to any computing device or volatile memory, there is only a limited power battery budget available.

Various embodiments provide systems that attempts to ensure data and application state information residing in volatile buffers (e.g., memory, cache, PCIe switch, switch, intermediate tiers, or other network devices) have sufficient battery power to flush (e.g., copy or back-up) data and application state to a persistent memory or storage device. For example, a network device can be any of switch buffers, packet buffers, routers, network interfaces, or switches, or combination thereof and can include volatile memory that stores data. Saving data and application state can help data processing operations resume and potentially meet applicable service level agreements (SLAs). Application state can include states and contents of processor registers generated during operation of an application or device. Another application or resource than the application or resource with interrupted power can use the context to resume data processing.

In the event of a power shutdown where a rack (or other computing platform design) switches to battery power before powering down all components, various embodiments provide an ability to prioritize critical data to be given priority to be flushed (copied) to persistent memory. Various embodiments provide prioritization of data flushing (copying) to persistent memory or storage based on an application running in a rack or other architecture. Various embodiments provide report (log) generation on what data was backed-up and what data was not backed-up, for applications running on one or more racks or other computing platform designs. After power is restored to the rack or other platform, the report or log can be used to determine a state of data, a state of applications, and what operations are needed to complete data processing. For example, data can be copied back to volatile memory in the rack or platform and the relevant resource can continue data processing. Application state can be accessed and the application can return to performing operations as though returning from an interrupt. Note that an application can refer to any or a combination of processor-executed software or hardware implemented operations.

In the event of a power shutdown and battery capacity is insufficient to handle all back-ups, various embodiments provide for non-critical data to be backed-up on a best effort basis. For example, best effort can be applied in cases where the amount of needed writes of non-critical data is high and a large percentage of the data in the caches and switch buffers are RDMA writes and need to be flushed. In some embodiments, back-up of non-critical data can be prioritized based on priority level of an associated application. In some embodiments, in addition or alternatively, back-up of non-critical data can be prioritized based on age of data (e.g., oldest data is backed-up before newer data).

Figure 4A:
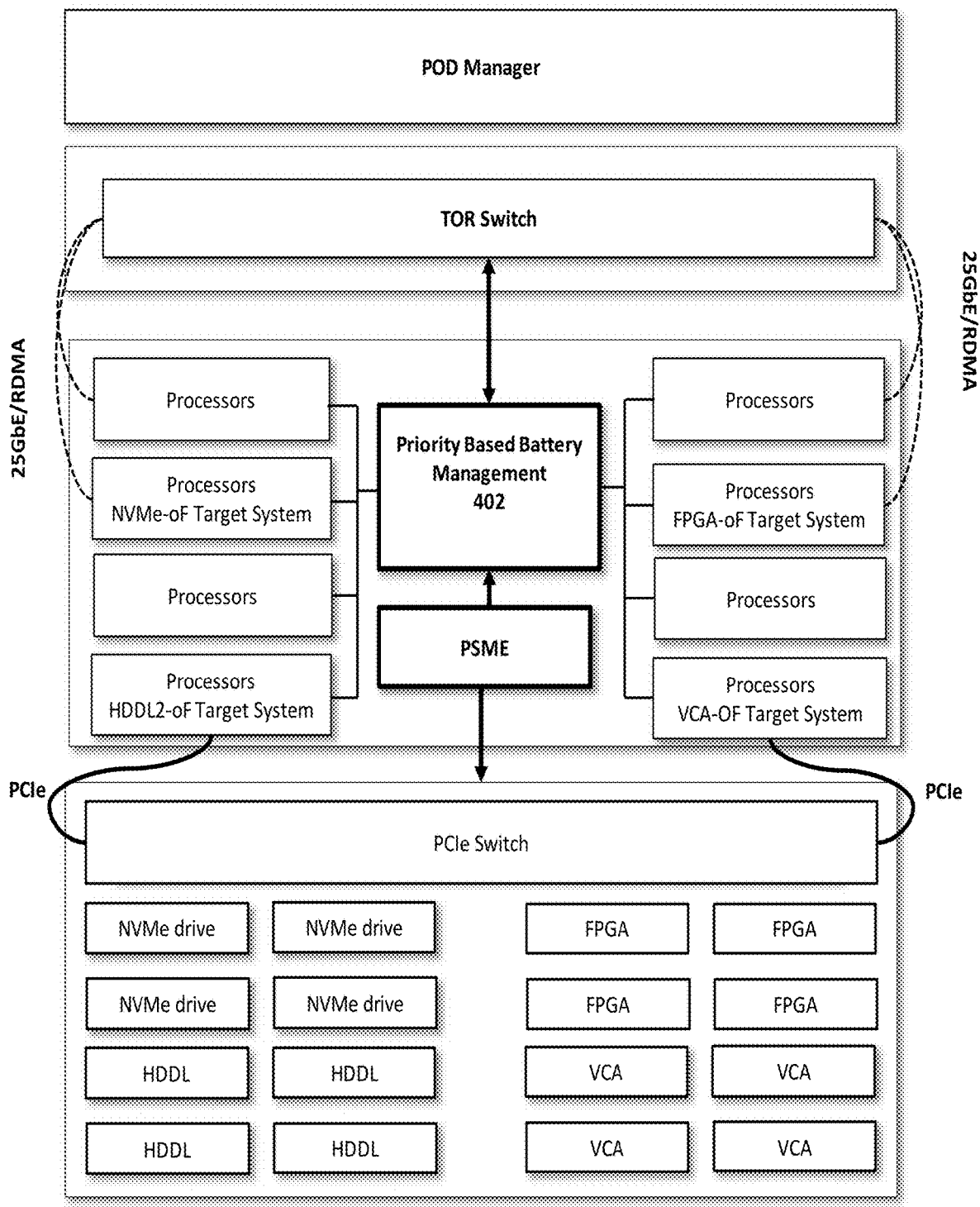
FIG. 4A depicts a system.

FIG. 4A depicts a system that can manage battery usage. A rack or other platform with compute resources uses priority based battery manager 402 to track an amount of dirty data and level of criticality of data per application for selected resources. Priority based battery manager 402 can track whether data or application was backed-up. In some examples, battery manager can use an interface to communicate with one or more resources. An interface can provide access to one or more of: an interconnect, bus interface, switch interface, network interface, or fabric interface. For example, a resource can be one or more of: a switch, PCIe switch, network interface controller, storage (including NVMe compatible logical or virtual storage), memory, memory pool, cache, accelerator, processor, central processing unit (CPU), core, graphics processing unit (GPU), general purpose graphics processing unit (GPGPU), field programmable gate array (FPGA), High-Density Deep Learning (HDDL) compute engines (or other devices configured for machine learning or inference related operations), or Visual Compute Accelerator (VCA) (or other image, audio, or video processor).

Power can be supplied to a rack, drawer, or platform that includes resources. Power can be supplied using an alternating current supply, renewable energy (e.g., solar, motion, wind), or other sources (not shown in FIG. 4A). A power supply outage can occur such as when voltage or current level drop below a threshold level for a specific amount of time. When a power supply outage occurs, priority based battery manager 402 determines a battery power budget to allocate to one or more of the resources depending on the amount of estimated dirty data pending to be flushed in a persistent media device in that resource and its criticality. In some embodiments, when a power supply outage occurs, priority based battery manager 402 can allocate battery power to backing-up (flushing) data used by specific applications or resources. When a power supply outage occurs, priority based battery manager 402 can allocate battery power to backing-up (flushing) specific applications states and contexts so that the applications can resume operation after the power is restored. Priority based battery manager 402 can allocate a battery power budget to selected resources to persist their status table that indicates what data was backed up. If not enough battery power is available for all selected resources, then battery manager can allocate a resource to at least persistently store status tables of highest priority resources.

In some examples, prior to an occurrence of a power supply outage, battery manager can allocate battery power for back-up of data, context, and back-up status to select resources.

Backing-up or flushing data associated with a resource can include copying data into persistent memory, memory supplied with power, or storage. The data can be provided in an Ethernet frame, or communications compatible with InfiniBand, Internet Wide Area RDMA Protocol (iWARP), quick UDP Internet Connections (QUIC), InfiniBand, and others, and transmitted to a remote device using a network or a fabric for storage. A fabric, network, or interconnect can be compatible at least with Ethernet, PCIe, Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, CCIX, and so forth. Data and logs can be stored to virtualized storage nodes using a protocol such as NVMe over Fabrics (NVMe-oF). In addition, or alternatively data can be backed-up to a storage node, memory pool, memory device, storage device in a neighboring rack with supplied power.

After completion of backing-up or flushing of data, priority based battery manager 402 can update a table with information that can be used when supply power is restored to a resource after reboot or start-up of the resource. For example, supply power can be restored after a current or voltage level meets or exceeds a threshold level for a particular time period. The information can identify what data was flushed or backed-up and can be copied to memory or cache of the resource to resume processing of data in memory or cache. In addition, application or resource context can be copied to memory or cache used by the application or resource so that the application or resource can return to operation as though returning from an interrupted state. An application or resource context can include registers contents used by an application to identify a state of an application prior to termination. For example, before removing resources or detaching resources or taking any other action that affects a given application, a set of registers can be exposed to a software stack where the software stack can write whether some resources are not going to be utilized anymore or can copy the registers to persistent storage using battery power for later use.

Figure 4B:
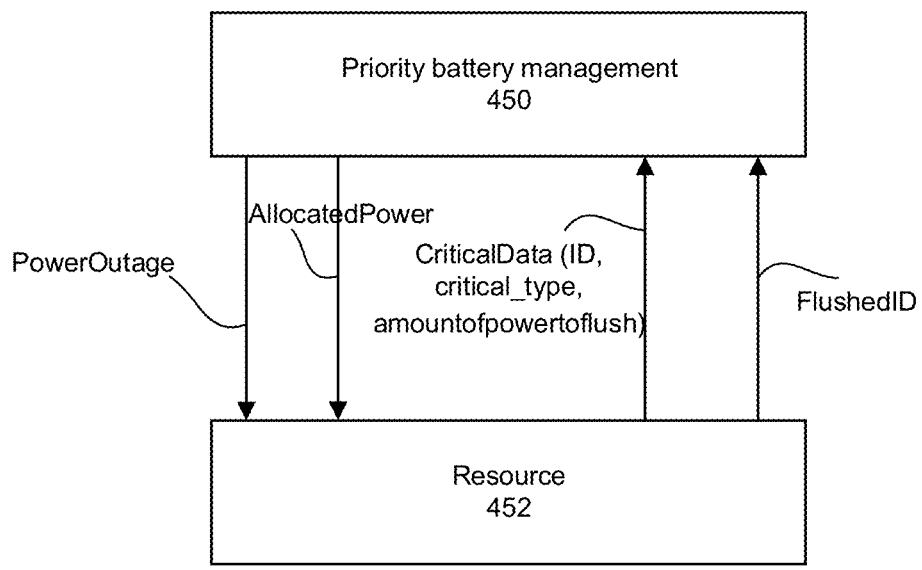
FIG. 4B depicts an example high level block diagram of interaction between priority based battery manager and a resource.

FIG. 4B depicts an example high level block diagram of an example interaction between a priority based battery manager and a resource. In response to detection of loss of power supply or loss of cooling supply, priority based battery manager 450 provides a PowerOutage signal to one or more resources to indicate a power supply is lost. In response to the PowerOutage signal, one or more resources 452 provide CriticalData (ID, critical_type, amountofpowertoflush) to priority based battery manager 450. Field ID can represent an identifier of the resource table (static information for a particular memory). Field critical_type can represent a level of criticality of data. Field amountofpowertoflush can represent an amount of battery power requested for use. One or multiple communications can be used to communicate FlushedID and CriticalData (ID, critical_type, amountofpowertoflush). After backing-up data or other content, one or more resources 452 provide FlushedID to priority based battery manager 450. FlushedID can represent a resource range that was flushed to persistent memory. Field flushedID can be created every time a new memory address range is to be flushed.

Figure 4C:
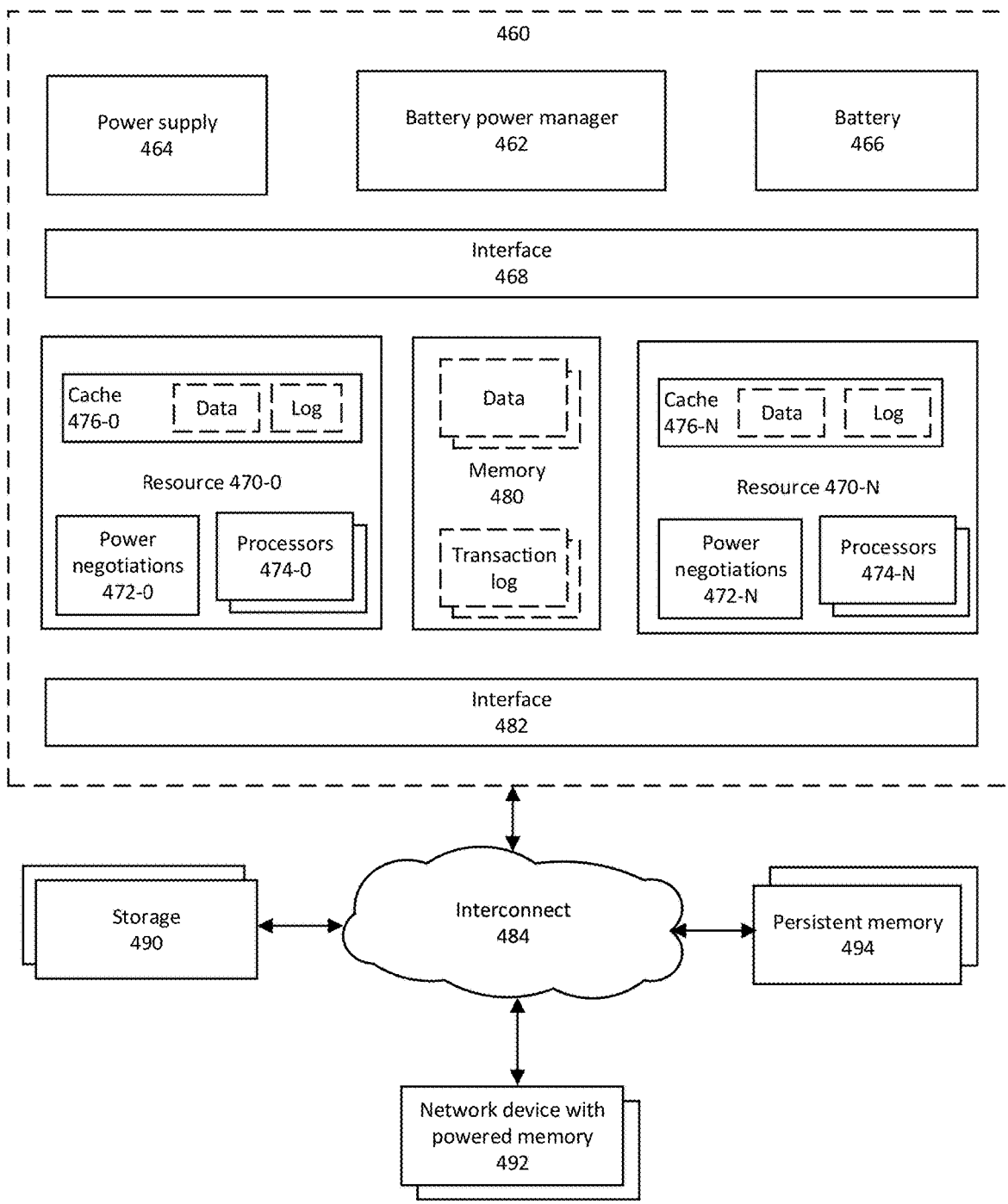
FIG. 4C depicts an example system and flow of operations.

FIG. 4C depicts a system and a flow of operations. System 460 can be a drawer, compute sled, compute node, or other aggregated or disaggregated device construct. Battery power manager 462 can detect loss of power (e.g., voltage level or current level being below a threshold level for a specific time duration) provided by power supply 464 to one or more of resources 470-0 to 470-N. Before or after loss of power provided by power supply 464, battery power manager 462 can determine an amount of battery power to allocate to one or more of resources 470-0 to 470-N to back-up one or more of: data processed by a resource and stored in volatile memory or cache, application or resource context, or transaction log that identifies which data has been backed-up to storage.

For example, battery power manager 462 can determine an amount of battery power to allocate to a resource based on information from one or more of resources 470-0 to 470-N that identifies one or more of: amount of data that is in volatile memory or cache, criticality level of data, data identifier, battery power requested to perform back-up, or priority level of resource or application that processes data stored in volatile memory or cache. An interface 468 can couple (e.g., provide signal transfer) among battery power manager 462, power supply 464, and battery and resources 470-0 to 470-N, memory 480, and interface 482.

A resource can use power negotiations 472 to request and receive battery power allocations with battery power manager 462. Non-limiting examples of resources 470-0 to 470-N include one or more processors 474 and cache 476. Processors can be any type of processor-executed software or hardware device and can use cache 476 to access data, store context, or store and access executable code. Resources 470-0 to 470-N can use memory 480 to store pre-processed data, post-processed data (e.g., data that has completed processing and is available for use or processing by another device), newly generated data, or transaction logs, among others.

Power supply loss can be detected by battery power manager 462 receiving an indication of power loss from a power supply module that includes power supply 464. Power supply loss can be detected by battery power manager 462 receiving an indication that battery power is supplied by battery 466. Other examples of determining power loss can be applied.

In the event of power supply loss, battery 466 can supply an amount of battery power to one or more of resources 470-0 to 470-N as specified by battery power manager 462. Supplied battery power can be specified in watts (W). One or more of resources 470-0 to 470-N can use battery power to back-up data according to a configured priority level. For example, data that is associated with higher priority applications or for lower latency completion requirements can be regarded as higher priority. Conversely, data that is associated with lower priority applications or for higher latency completion requirements can be regarded as lower priority. Higher priority data can be backed-up using allocated battery power. Surplus battery power can be used by a resource to back-up next highest priority data. In addition to backing up data in volatile memory, a resource can back-up its log or application or resource context to at least storage, powered volatile memory, or persistent memory.

System 460 can use interface 482 to communicate using interconnect 484 to one or more of storage 490, network device with powered memory 492, or persistent memory 494. Interconnect 484 can be any network medium, fabric, interconnect, or bus (or combination thereof). System 460 can back-up one or more of data in cache or volatile memory, back-up data log in cache or volatile memory, and/or application or resource context in cache or volatile memory to any of storage 490, network device with powered memory 492, or persistent memory 494.

System 460 can use and apply structures and method of other embodiments described herein. System 460 can be implemented using hardware elements, software elements, or a combination of both.

Figure 5A:
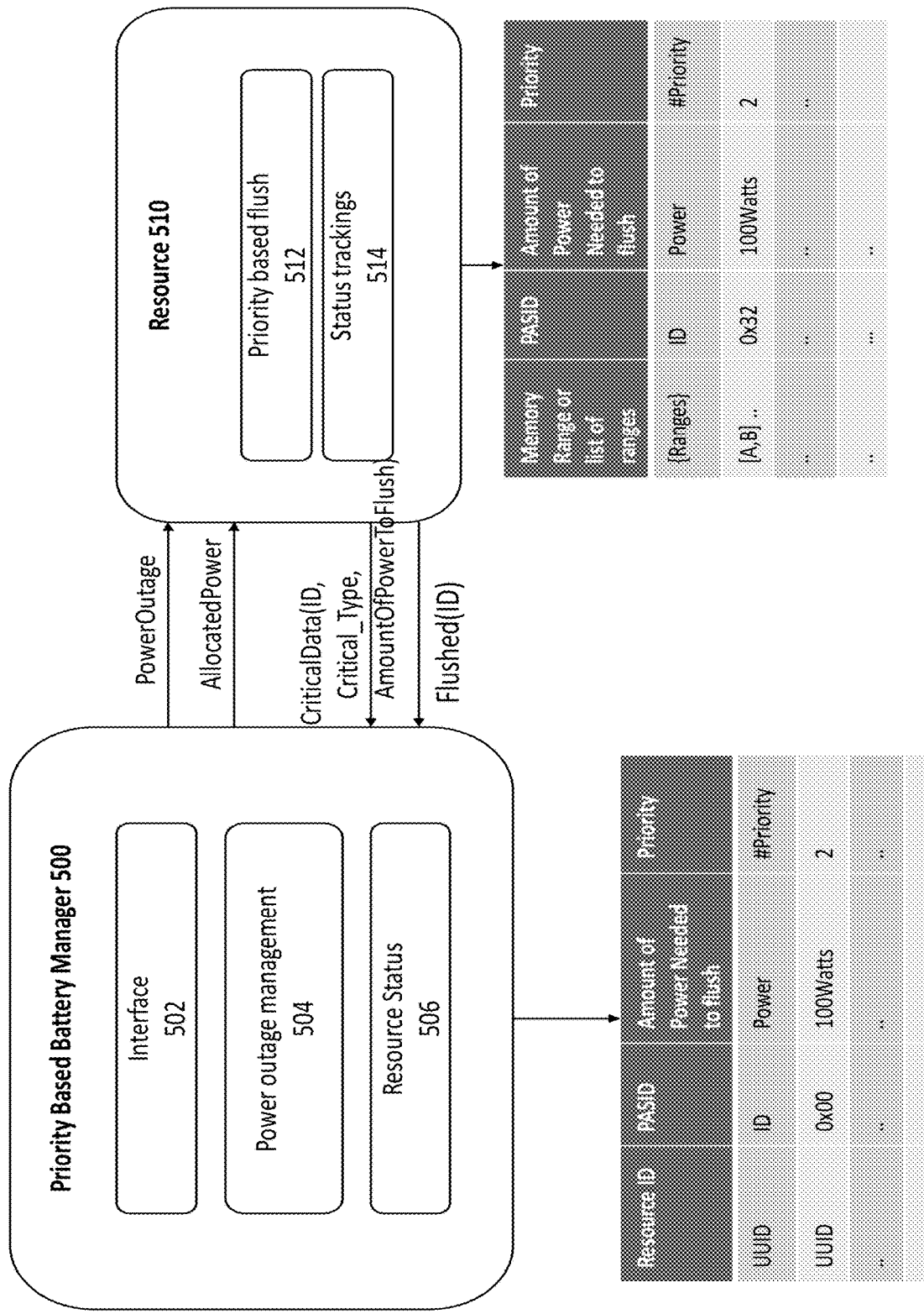
FIG. 5A depicts an example system.

FIG. 5A depicts an example system. Priority based battery manager 500 can identify when a power source stops supplying power to a resource, drawer, or rack, among others. For example, if a battery back-up supply (not shown) informs priority based battery manager 500 that battery power is being supplied, priority based battery manager 500 can determine that a power supply outage has occurred. For example, priority based battery manager 500 can use interface 502 to communicate with a power supply or battery back-up supply. For example, priority based battery manager 500 can use power outage management 504 to detect a power outage and determine resources to manage in the event of a power outage.

Power outage management 504 can track a status of the resources and decide which of them needs to be provided with power budget in the event of a power outage. For each selected resource, priority based battery manager 500 can track one or more of: 1) resource ID (identifier of a resource), 2) process address ID (PASID) (e.g., used to identify for which application a data flush is being managed), 3) amount of estimated power required to flush (back-up) data in the resource, or 4) level of criticality of the data which is provided by the software stack and conveyed as part of the data payloads (e.g., a few bits in the memory lines). In case of a power failure, a resource with backed-up data, back-up log, and context can recover what potentially went wrong or continue to process data as if interrupted after power is restored.

Resource 510 can track an amount of data (e.g., dirty data or data corresponding to a memory region that has been modified) and a particular level of associated criticality. Resource 510 can track one or more of: (a) type of data in volatile memory or cache (e.g., dirty or not dirty), (b) the associated application, (c) the amount of data for that type, (d) specific address ranges in memory associated with the data, (e) process address ID (PASID) (e.g., used to identify for which application a data flush is being managed), (f) amount of power needed to flush an address range, (g) priority level of data, or (h) priority level of application.

Priority based battery manager 500 can maintain a list of resources and query all or selected resources to inform the resources of a power outage that are relevant to data transfer. A query can be in the form of an indication of power outage (PowerOutage). In response to the query, resource 510 can respond with information that can assist priority based battery manager 500 to determine an amount of battery power to allocate to resource 510 for back-up operations. For example, resource 510 can specify to priority based battery manager 500 at least identification of fields ID, critical_type, and amountofpowertoflush, described earlier.

Priority based battery manager 500 can allocate battery power to one or more resources based at least on amount of data to be backed-up and level of criticality of the data. Priority based battery manager 500 can provide at least some resources with battery power to persist a log of what data was backed-up. For example, priority based battery manager 500 can perform round robin allocation of battery power to each selected resource with critical data level 1 (highest level), round robin allocation of remaining battery power to each selected resource with critical data level 2 (next highest level), and so forth. Data criticality level can be associated with priority of a resource or application. For example, a PCIe switch or network interface can store data from different entry points and can be considered highest criticality level for battery allocation. A last leg of data transit can be considered high priority in order to finish a last leg of transit. For example, data analytics for a client can be identified as a high priority job. A job involving transferring data from one endpoint to a service can be identified as high priority.

Priority based battery manager 500 can apply a policy to allocate battery power to resources based on data criticality and for which selected resources can be programmed by an administrator, orchestration, or POD manager, among others.

In some embodiments, priority based battery manager 500 informs a resource of an amount of battery power available for use using communication AllocatedPower. A resource (e.g., resource 510) is to perform a data flush using battery power allocated by priority based battery manager 500. Resource 510 selects in a priority order the data to be flushed to persistent media. Resource 510 notifies priority based battery manager that a particular data set ID is finished backing up. Resource 510 can provide priority based battery manager 500 with Flushed(ID) to identify what data has been flushed or sent to persistent memory or non-volatile memory. Resource 510 can also notify priority based battery manager 500 that a given amount of particular data (e.g., an address range in memory) with a given priority has not been flushed into persistent data.

In some embodiments, even prior to a power supply outage and use of battery power, resource 510 can proactively back-up data one or more times to storage and inform priority battery management 500 of back-up status. In the event of a power supply outage, if the back-up status has not changed, resource 510 can indicate no change in status and no need for data back-up and less power can be allocated to resource 510 as resource 510 has backed-up its data. Accordingly, an indicator can be provided by rack resource to priority battery management to indicate no battery power is needed. However, priority battery management 500 can allocate battery power to resource 510 to back-up its data back-up log and store application or resource context.

Figure 5B:
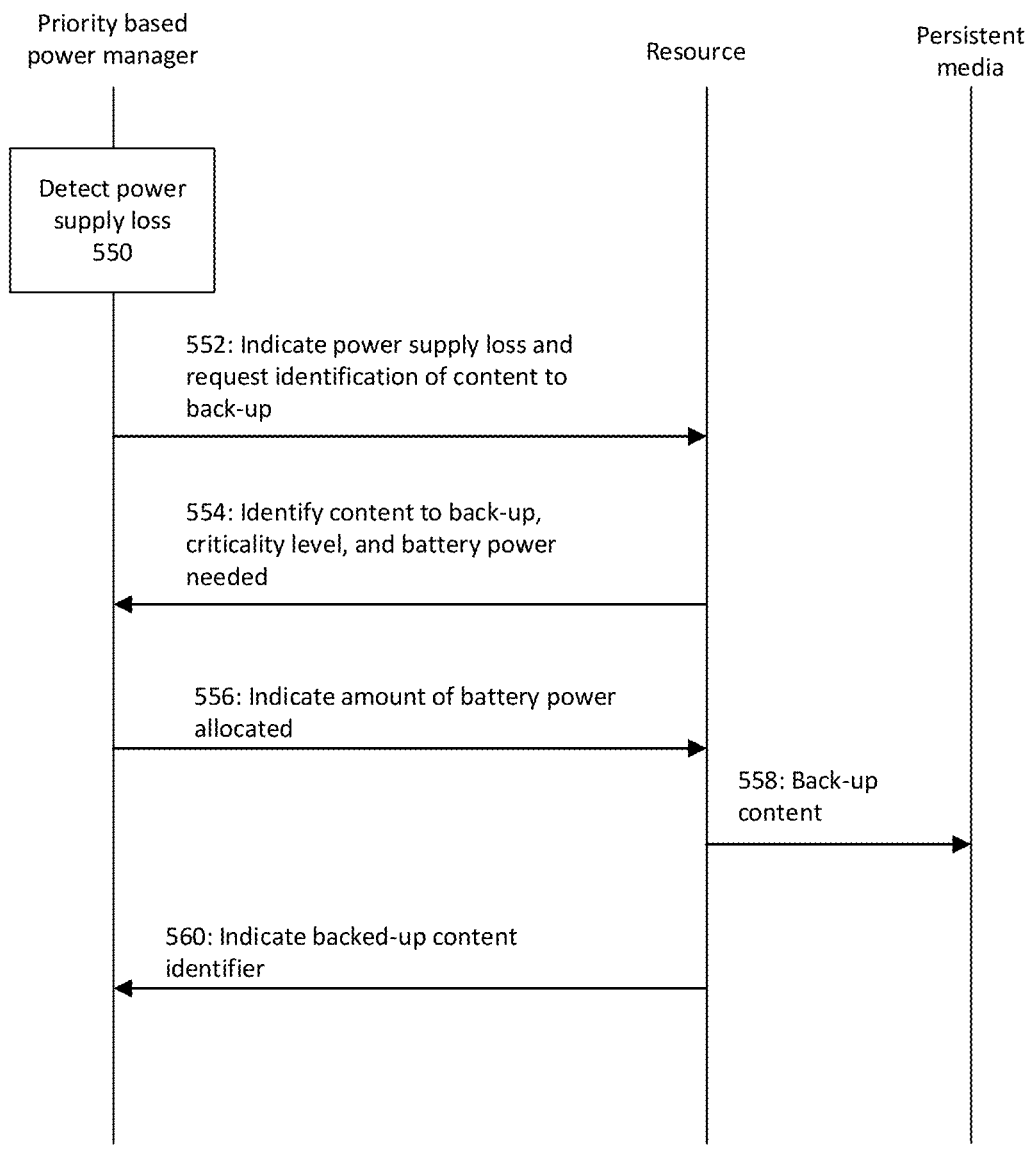
FIG. 5B depicts an example sequence of events.

FIG. 5B depicts an example sequence of events. At 550, a priority based power manager detects power supply loss affecting one or more resources. At 552, priority based power manager indicates power supply loss to a resource and requests identification of content to back-up. At 554, a resource identifies content to back-up, criticality level, and battery power needed for the content back-up. At 556, the priority based power manager indicates an amount of battery power allocated to the resource. At 558, the resource uses battery power to back-up content to persistent media. At 560, the resource indicates to priority based power manager an identifier of backed-up content.

Figure 6A:
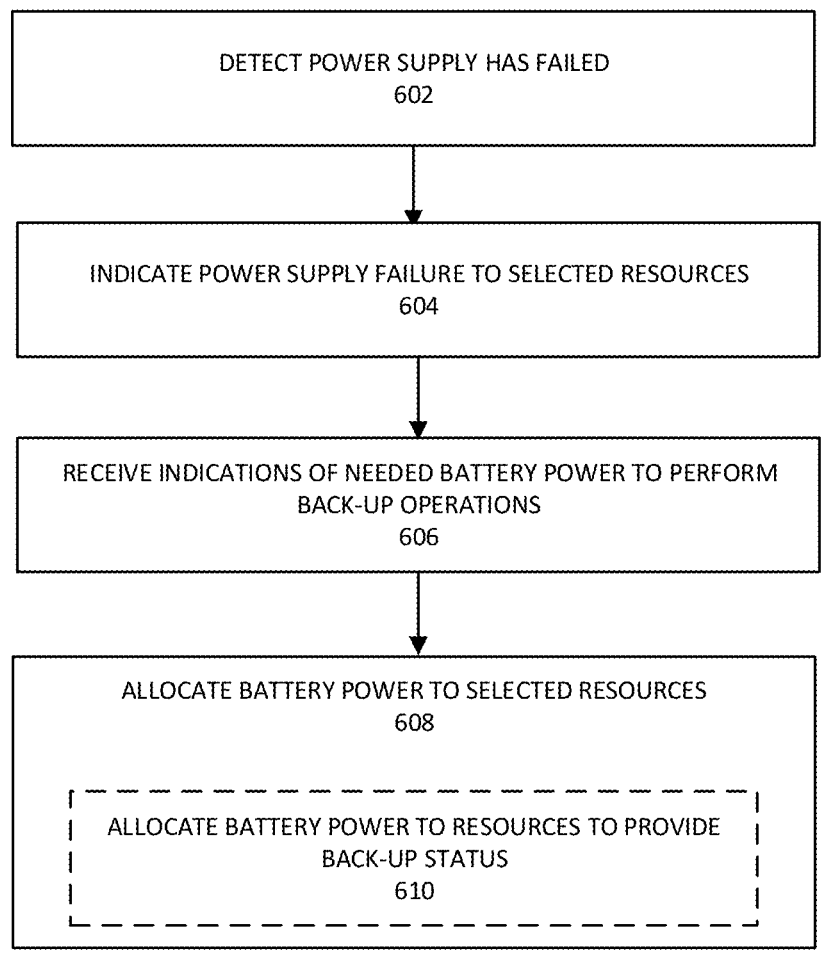
FIG. 6A depicts a process that can be used to allocate battery power to one or more resources.

FIG. 6A depicts a process that can be used to allocate battery power to one or more resources. The process of FIG. 6A can be performed by a battery manager, for example. At 602, the process detects a power supply to one or more resources has failed. For example, a power supply can be identified as failed if the current or voltage is less than a threshold level for more than threshold period of time either continuously or cumulatively over different time segments. For example, a power supply can be identified as failed if a cooling system has failed or battery power is being provided. A power supply can provide power to one or more resources.

At 604, the process indicates to selected one or more resources that the power supply has failed. For example, some or all resources in a rack can be selected to receive an indication of power supply failure. In some examples, higher priority resources can be selected such as switches, network devices, resources that are marked as higher priority, and applications that are marked as higher priority. In some examples, a battery manager can inform select resources that battery power is being used or is to be used.

At 606, the process receives indications of needed battery power to perform back-up operations. In some examples, a resource provides at least one or more of: a criticality level of a resource, an amount of data to be backed-up (including context and data back-up log), and requested amount of battery power to perform data back-up. Other examples of information provided are described herein. A battery power manager determines an amount of battery power needed based at least on information provided by the resource.

At 608, the process allocates battery power to selected resources for use based on applicable policies. Applicable policies can prioritize battery allocation to particular data used by particular applications or types of applications, specified data criticality level, resource priority level, or other factors described herein. In some examples, a battery manager can allocate battery power to selected resources. Allocation of battery power can be specified directly and one or more batteries configured to provide that amount of power. In addition, at 610, allocation of battery power can include power to back-up a log table into storage or convey the log table to the battery power manager.

Figure 6B:
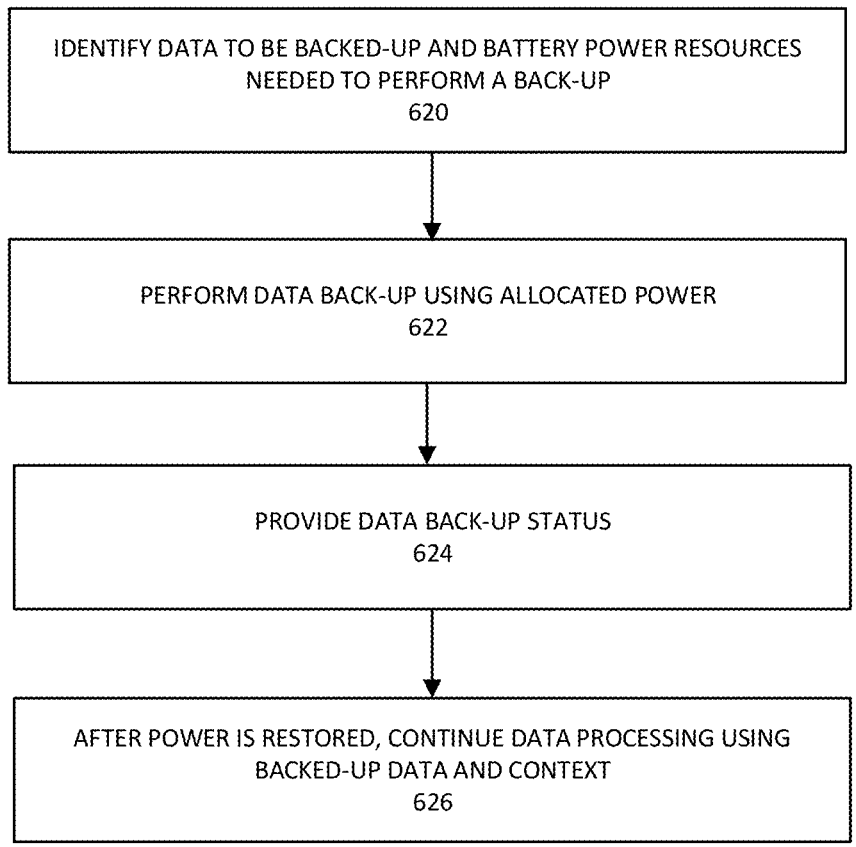
FIG. 6B depicts an example process to back-up data and restore data.

FIG. 6B depicts an example process to back-up data and restore data for processing. The process can be performed by a resource in a rack or other platform. At 620, a resource can identify data to be backed-up and, optionally, identify battery power needed to perform a back-up. For example, a resource can track data that is being processed or has completed processing and has not yet been copied to a next memory region or stored into persistent storage. The resource can assign a criticality rating (e.g., high, medium, low or other scale) to data that is being processed or has been generated from processing and has not yet been copied to a next memory region or persisted. The resource can identify an amount of data that is being processed or has been generated from processing and has not yet been copied to a next memory region or stored to persistent memory. The resource can indicate an amount of battery power needed to back-up data in each criticality level. In some examples, the resource can also indicate an amount of battery power needed to back-up a table or log indicating what data has been backed-up and optionally, what data has not been backed-up. Note that 620 can be triggered by an indication that a power supply to the resource has failed.

At 622, the process continues with performing data back-up using allocated battery power. For example, a resource can receive an allocation of battery power from a battery power manager and use the battery power to perform a back-up on data. Back-up can be prioritized for highest criticality level data. In some cases, if not enough power is allocated to back-up all highest criticality level data, highest criticality level data can be backed up and remaining battery power can be allocated for completion of back-up of a lower criticality level data. Data can be backed-up by use of a network or fabric interface to transmit data to a storage device. Data can be transferred using a bus or interface (e.g., PCIe) to a storage device.

In some examples, a resource can choose to use battery power can be used to complete processing instead of backing-up data. Battery power could be used by a resource for maintaining communications with external devices such as a TOR switch, network devices, or other devices (e.g., FPGAs).

At 624, the process provides a data back-up status. A resource can capture data back-up status in a table or log and can indicate what data has been backed-up and optionally, what data has not been backed-up. In some embodiments, battery power is allocated to at least some resources to back-up the table or log to a storage device or to the battery power manager. In some examples, the table or log can be compressed prior to transmission or transfer to reduce an amount of battery power used to transfer the table or log.

At 626, after power is restored to the resource, the resource can continue data processing using the backed-up data. For example, the backed-up data can be copied from storage via an interface, fabric, network, or bus and made available to the resource to continue to process the data and complete operations. Application or resource context can be loaded from storage for use to continue operations where they were stopped. The log of backed-up data can also be copied to the resource so that the resource can resume tracking a status of backing-up data.

Figure 6C:
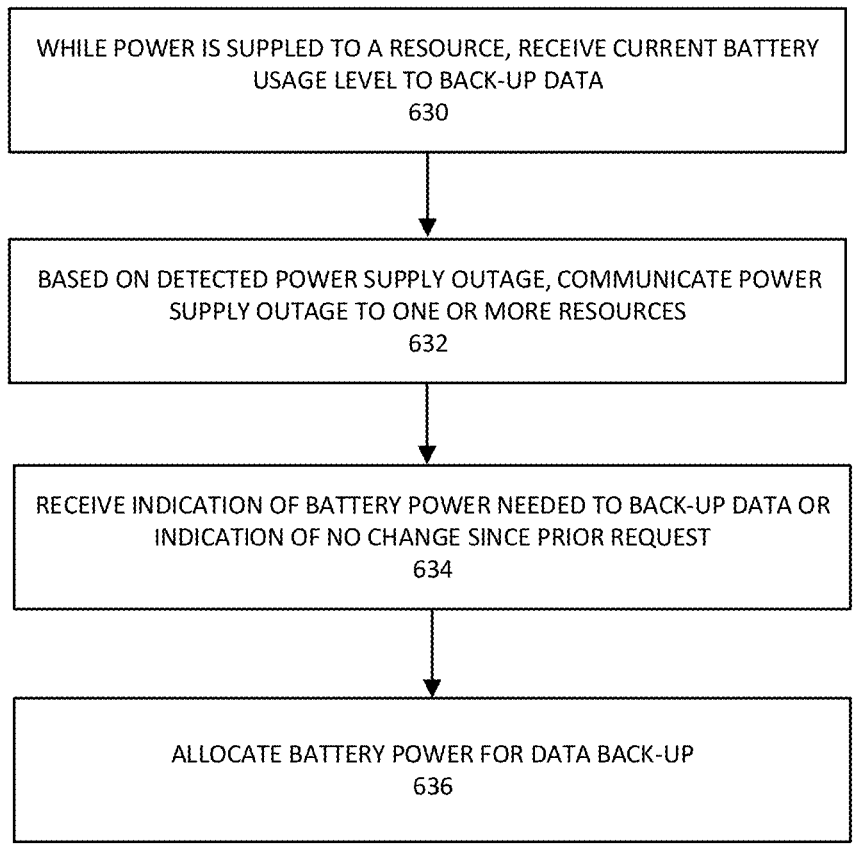
FIG. 6C depicts another example process that can be used to allocate battery power to one or more resources.

FIG. 6C depicts another example process that can be used to allocate battery power to one or more resources. The process of FIG. 6C can be performed by a battery manager. At 630, while power is supplied to a resource, the process can receive current battery needs to back-up data. Battery needs to back-up data can be represented as an explicit battery level need request or by indicating an amount of data and criticality level of data to back-up. For example, data that is to be backed-up can be processed or has been generated from processing and has not yet been copied to a next memory region for use or storage can be assigned a criticality rating (e.g., high, medium, low or other scale). An amount of data that is being processed or has been generated from processing and has not yet been copied to a next memory region or storage can be identified as well. A resource can indicate an amount of battery power needed to back-up data in each criticality level. In some examples, the resource can also indicate an amount of battery power needed to back-up a table or log indicating what data has been backed-up and optionally, what data has not been backed-up. Updates to battery power needs to back-up data can be received from one or more resources.

At 632, the process communicates with one or more resources that power supply outage has occurred based on detecting a power supply outage. The power supply outage can be detected based on similar factors described with respect to 602 of FIG. 6A.

At 634, the process receives an indication of battery power needed from one or more resources to back-up data. Data back-up can include a log of backed-up data and resource context. In some cases, the resource can provide an indication that no changes have occurred since the last reporting of battery needs (whether an explicit battery use request or by indication of amount of data to back-up and criticality level). If changes have occurred since the last reporting of battery needs, either explicit battery needs or indication of amount of data to back-up and criticality level is received.

At 636, the process allocates battery power to one or more selected resources. Allocation of battery power can be similar to the 608 and 610, described earlier.

Figure 6D:
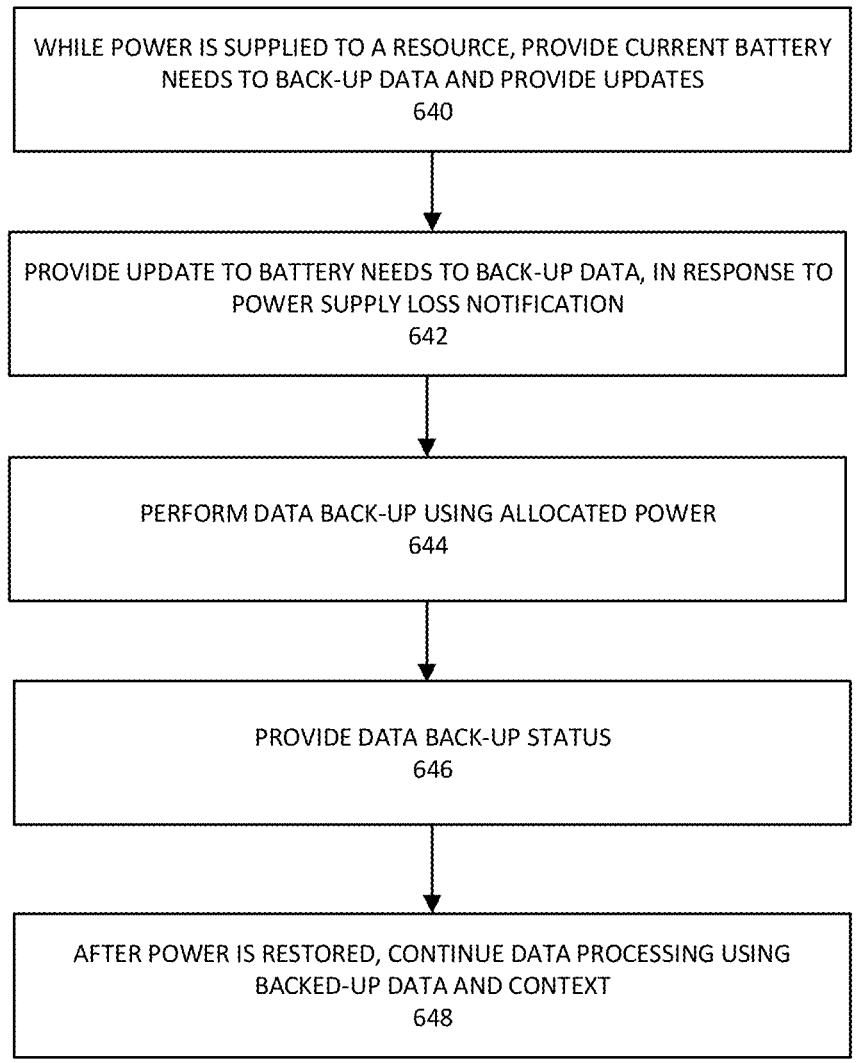
FIG. 6D depicts an example process to back-up data using battery power.

FIG. 6D depicts an example process to back-up data using battery power. The process can be performed by a resource. At 640, while power is supplied to a resource, the process provides current battery needs to back-up data. For example, data that is being processed or has been generated from processing and has not yet been copied to a next memory region for use or stored in storage can be assigned a criticality rating (e.g., high, medium, low or other scale). An amount of data that is being processed or has been generated from processing and has not yet been copied to a next memory region can be identified as well. A resource can indicate an amount of battery power needed to back-up data in each criticality level. In some examples, the resource can also indicate an amount of battery power needed to back-up a table or log indicating what data has been backed-up and optionally, what data has not been backed-up. Data can include a resource context. In the event of a change in battery needs to back-up data, the resource can provide an update of explicit battery needs or an indication of data to back-up and criticality level. Providing power needs when power is supplied can reduce battery power needed to communicate battery needs and/or back-up data later if power supply is lost.

In some examples, the resource can back-up data proactively for at least some applications and indicate such activity using the log.

At 642, the process provides an update to power supply needs or an indication of no change based on receipt an indication that power supply is lost. The update can be provided by a resource to a battery manager. As stated earlier with respect to 634, the resource can provide an indication that no changes have occurred since the last reporting of battery needs (whether an explicit battery use request or by indication of amount of data to back-up and criticality level). If changes have occurred since the last reporting of battery needs, either explicit battery needs or at least an indication of amount of data to back-up and criticality level can be provided to a battery manager.

At 644, the process performs data back-up using allocated power. At 646, the process provides data back-up status. At 648, the process continues data processing using backed-up data and context. Actions 644, 646, and 648 can be similar to respective actions 622, 624, and 626.

Figure 7:
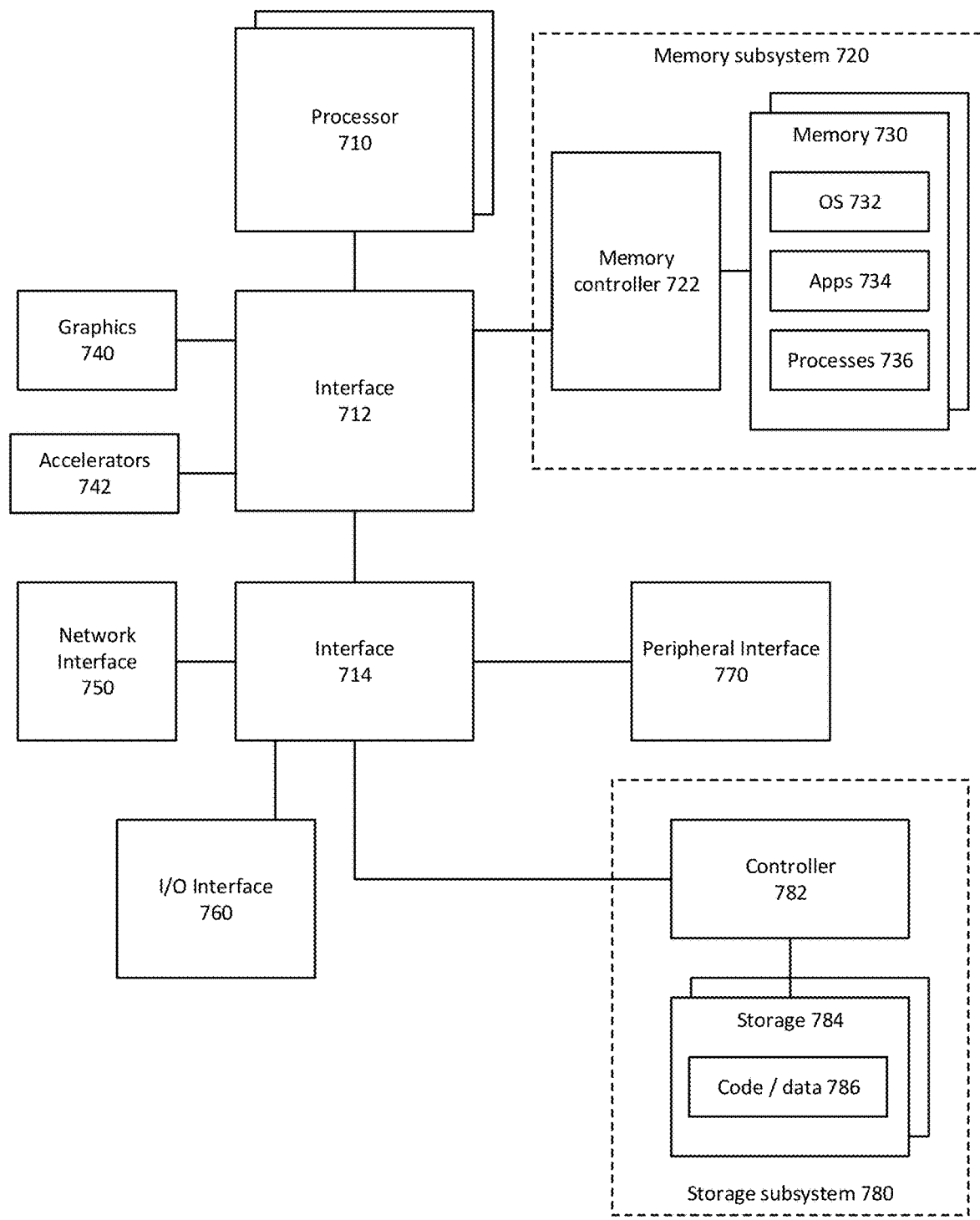
FIG. 7 depicts a system.

FIG. 7 depicts a system. The system can use embodiments described herein at least to allocate battery power to back-up content in volatile memory. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080 p), retina displays, 4 K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions.

Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), W102 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 8:
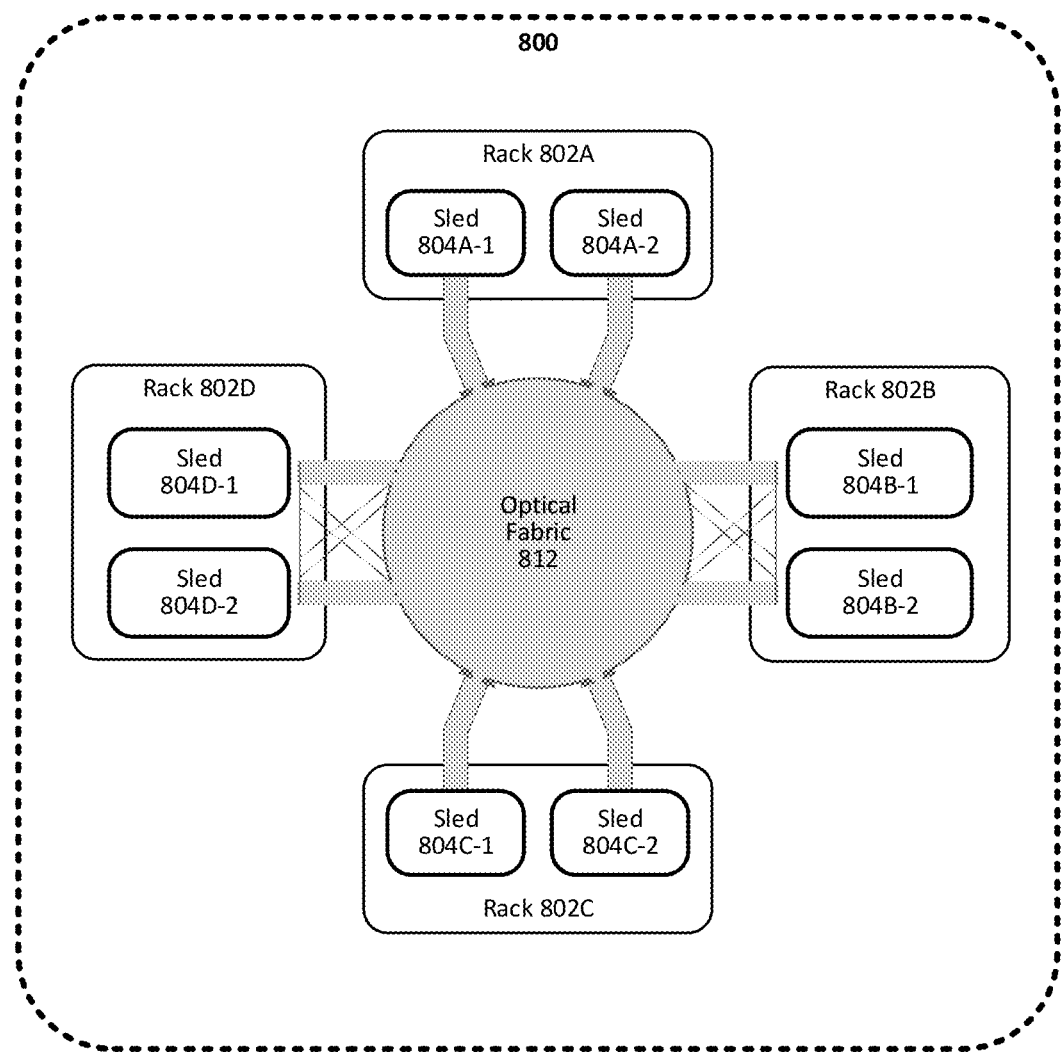
FIG. 8 depicts an example of a data center.

FIG. 8 depicts an example of a data center. Various embodiments can be used in or with the data center of FIG. 8 to back-up content to memory or storage via accelerator fabrics. As shown in FIG. 8, data center 800 may include an optical fabric 812. Optical fabric 812 may generally include a combination of optical signaling media (such as optical cabling) and optical switching infrastructure via which any particular sled in data center 800 can send signals to (and receive signals from) the other sleds in data center 800. The signaling connectivity that optical fabric 812 provides to any given sled may include connectivity both to other sleds in a same rack and sleds in other racks. Data center 800 includes four racks 802A to 802D and racks 802A to 802D house respective pairs of sleds 804A-1 and 804A-2, 804B-1 and 804B-2, 804C-1 and 804C-2, and 804D-1 and 804D-2. Thus, in this example, data center 800 includes a total of eight sleds. Optical fabric 812 can provide sled signaling connectivity with one or more of the seven other sleds. For example, via optical fabric 812, sled 804A-1 in rack 802A may possess signaling connectivity with sled 804A-2 in rack 802A, as well as the six other sleds 804B-1, 804B-2, 804C-1, 804C-2, 804D-1, and 804D-2 that are distributed among the other racks 802B, 802C, and 802D of data center 800. The embodiments are not limited to this example. For example, fabric 812 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a power management system comprising: an interface and a battery manager communicatively coupled to the interface, the battery manager to: detect power supply loss, request a battery-use budget from one or more selected resources, and allocate a battery-use budget to the one or more selected resources including at least battery budget for the one or more selected resources to store a transaction log of backed-up data.

Example 2 includes any example, wherein the battery manager is to allocate battery-use based on one or more of: criticality level of data, priority of an application that processes the data, amount of data to be backed-up, priority level of resource, or requested battery usage.

Example 3 includes any example and includes a power source coupled to receive power from an alternating current supply, wherein the power source is to output power to one or more resources.

Example 4 includes any example and includes one or more resources coupled to the interface and comprising one or more of a non-volatile memory, persistent memory, or volatile memory and wherein the one or more resources are to back-up data stored in volatile memory to one or more of the non-volatile memory, persistent memory, or volatile memory.

Example 5 includes any example and includes one or more resources coupled to the interface and wherein the one or more resources are to back-up the transaction log of backed up data into non-volatile memory using allocated battery power.

Example 6 includes any example, wherein the transaction log is to identify data stored in volatile memory that was not backed-up.

Example 7 includes any example, wherein the interface comprises a switch interface, fabric interface, or a network interface.

Example 8 includes any example and includes one or more resources coupled to the interface, wherein one or more resources comprise one or more of: a switch, network device, storage, memory, memory pool, cache, accelerator, processor, central processing unit (CPU), core, graphics processing unit (GPU), general purpose graphics processing unit (GPGPU), field programmable gate array (FPGA), machine learning or inference-related device, or image, audio, or video processor.

Example 9 includes any example, wherein after power from a power supply is restored, a first resource is to access at least the transaction log to determine which backed-up data to copy and to continue operation.

Example 10 includes any example, wherein: the first resource is to back-up context information, after power supply is restored, the first resource is to access the transaction log to determine which backed-up data to copy, and the first resource is to continue operation based on the copied backed-up data and the context information.

Example 11 includes any example and includes a first resource, wherein: the first resource is to indicate a battery-power use need for data back-up prior to a power supply loss and in response to a power supply loss, the first resource is to indicate any update to battery-power use need from a prior indication.

Example 12 includes any example and includes a rack, server, or data center.

Example 13 includes a computer-implemented method comprising: detecting a power supply outage; providing an indication to at least one resource of a power outage based on the detected power supply outage; receiving an indication of criticality level of data and amount of data to back-up; and allocating battery power to a first resource based at least, in part, on the criticality level of data and amount of data to back-up.

Example 14 includes any example and includes allocating battery power to the first resource to at least store a log of data backed-up to storage after the power supply outage.

Example 15 includes any example and includes after power supply is restored, the first resource accessing the log to determine which backed-up data to copy and use for processing.

Example 16 includes any example and includes allocating battery power to the first resource to at least store a log of both data backed-up to storage and data that was not backed-up to storage.

Example 17 includes any example and includes receiving priority level of an application that uses data and wherein allocating battery power to a first resource is based at least, in part, on the criticality level of data, amount of data to back-up, and the priority level of an application.

Example 18 includes any example, wherein at least one resource comprises one or more of: a switch, network device, storage, memory, memory pool, cache, accelerator, processor, central processing unit (CPU), core, graphics processing unit (GPU), general purpose graphics processing unit (GPGPU), field programmable gate array (FPGA), machine learning or inference-related device, or image, audio, or video processor.

Example 19 includes a system comprising: a battery; one or more resources; and a power management system to manage battery usage of the one or more resources and based on detection of power supply loss to at least one of the one or more resources, the power management system is to: indicate power loss to at least one resource; receive one or more of: criticality level of data, priority level of an application that processes the data, amount of data to be backed-up, or requested battery usage; and allocate battery use to a first resource based on one or more of: criticality level of data, priority level of an application that processes the data, amount of data to be backed-up, or requested battery usage.

Example 20 includes any example, wherein the power management system is to allocate battery-use budget to one or more resources to store a transaction log of backed-up data.

Example 21 includes any example, wherein the data to be backed-up comprises one or more of: processed data, log of data that is backed-up, or context of application or resource.

Example 22 includes any example, wherein the one or more resources comprise one or more of: a switch, network device, storage, memory, memory pool, cache, accelerator, processor, central processing unit (CPU), core, graphics processing unit (GPU), general purpose graphics processing unit (GPGPU), field programmable gate array (FPGA), machine learning or inference-related device, or image, audio, or video processor.

What is claimed is:

1. A power management system comprising:
   an interface and
   circuitry communicatively coupled to the interface, the circuitry to:
   allocate battery power budget for use by one or more hardware resources to perform at least one action based on priority level of the at least one action;
   based on detection of power supply loss:
   access the battery power budget allocation, and
   allocate battery-use from the battery power budget allocation to at least one hardware resource of the one or more hardware resources to perform one or more of the at least one action, wherein the at least one action comprises store a transaction log that is to identify backed-up data and the transaction log is to identify data stored in volatile memory that was not backed-up.

2. The power management system of claim 1, wherein the circuitry is to allocate battery power budget for use by one or more hardware resources to perform at least one action based on priority level of the at least one action based on one or more of: criticality level of data, priority of an application that processes the data, amount of data to be backed-up, priority level of resource, or requested battery usage.

3. The power management system of claim 1, comprising a power source coupled to receive power from an alternating current supply, wherein the power source is to output power to one or more hardware resources.

4. The power management system of claim 1, comprising the at least one hardware resource coupled to the interface and comprising one or more of a non-volatile memory, persistent memory, or volatile memory and wherein the at least one of the hardware resources is to back-up data stored in volatile memory to one or more of the non-volatile memory, persistent memory, or volatile memory.

5. The power management system of claim 1, comprising the one or more hardware resources coupled to the interface and wherein the one or more hardware resources are to back-up a transaction log of backed up data into non-volatile memory using allocated battery power.

6. The power management system of claim 1, wherein the interface comprises a switch interface, fabric interface, or a network interface.

7. The power management system of claim 1, comprising the at least one hardware resource coupled to the interface, wherein the at least one hardware resource comprise one or more of: a switch, network device, storage, memory, memory pool, cache, accelerator, processor, central processing unit (CPU), core, graphics processing unit (GPU), general purpose graphics processing unit (GPGPU), field programmable gate array (FPGA), machine learning or inference-related device, or image processor, audio processor, or video processor.

8. The power management system of claim 1, wherein after power from a power supply is restored, a first hardware resource of the at least one hardware resource is to access at least the transaction log to determine which backed-up data to copy and to continue operation based on copied backed-up data.

9. The power management system of claim 8, wherein:
   the at least one action comprises back-up context information,
   after power supply is restored, the first hardware resource is to access the transaction log to determine which backed-up data to copy, and
   the first hardware resource is to continue operation based on the copied backed-up data and the context information.

10. The power management system of claim 1, wherein:
    a first hardware resource of the at least one hardware resource is to indicate a battery-power use need for data back-up prior to a power supply loss and
    in response to a power supply loss, the first hardware resource is to indicate an update to battery-power use need from a prior indication.

11. The power management system of claim 1, wherein the at least one hardware resource comprises components of a rack, server, or data center.

12. A computer-implemented method comprising:
    allocating battery power budget for use by one or more hardware resources to perform at least one action based on priority level of the at least one action;
    based on detection of a power supply outage:
    accessing the battery power budget allocation,
    allocating battery-use from the battery power budget allocation to a first hardware resource of the one or more hardware resources to perform one or more of the at least one action, and allocating battery power to the first hardware resource to at least store a log identifying both data backed-up to storage and data that was not backed-up to storage.

13. The method of claim 12, comprising allocating battery power budget to the first hardware resource to at least store a log of data backed-up to storage after the power supply outage.

14. The method of claim 13, comprising:
after power supply is restored, the first hardware resource accessing the log to determine which backed-up data to copy and use for processing.

15. The method of claim 12, comprising receiving priority level of an application that uses data and wherein allocating battery-use budget to a first hardware resource is based at least, in part, on criticality level of the data, amount of the data to back-up, and the priority level of the application.

16. The method of claim 12, wherein at least one hardware resource comprises one or more of: a switch, network device, storage, memory, memory pool, cache, accelerator, processor, central processing unit (CPU), core, graphics processing unit (GPU), general purpose graphics processing unit (GPGPU), field programmable gate array (FPGA), machine learning or inference-related device, or image processor, audio processor, or video processor.

17. A system comprising:
a battery;
one or more hardware resources; and
circuitry to allocate battery power budget for use by the one or more hardware resources to perform at least one action based on priority level of the at least one action and based on detection of power supply loss to at least one of the one or more hardware resources, the circuitry is to:
based on detection of power loss to at least one resource;
allocate battery use from the battery power budget allocation to a first resource of the one or more hardware resources to perform one or more of the at least one action and to store a log that is to identify both data backed-up to storage and data that was not backed-up to storage.

18. The system of claim 17, wherein
an action of the at least one action comprises store a transaction log of backed-up data and
the circuitry is to allocate battery power budget to one or more hardware resources to store the transaction log of backed-up data.

19. The system of claim 18, wherein the backed-up data comprises one or more of: processed data or context of application or resource.

20. The system of claim 17, wherein the one or more hardware resources comprise one or more of: a switch, network device, storage, memory, memory pool, cache, accelerator, processor, central processing unit (CPU), core, graphics processing unit (GPU), general purpose graphics processing unit (GPGPU), field programmable gate array (FPGA), machine learning or inference-related device, or image processor, audio processor, or video processor.

21. At least one non-transitory computer-readable medium comprising instructions stored thereon, that if executed by one or more processors, cause the one or more processors to:
allocate battery power budget for use by one or more hardware resources to perform at least one action based on priority level of the at least one action;
based on detection of power supply loss:
allocate a battery-use from the battery power budget allocation to at least one hardware resource of the one or more hardware resources to perform one or more of the at least one action, wherein the at least one action comprises store a transaction log that identifies backed-up data and identifies data stored in volatile memory that was not backed-up.

22. The at least one non-transitory computer-readable medium of claim 21, wherein the one or more hardware resources comprise components of a rack, server, or data center.

* * * * *